United States Patent [19]

Brown

[11] Patent Number: 5,152,384
[45] Date of Patent: Oct. 6, 1992

[54] VISCOUS FLUID COUPLING AND REMOTE CONTROL ASSEMBLY THEREFOR

[75] Inventor: Richard J. Brown, Marshall, Mich.

[73] Assignee: Eaton Corporation, Cleveland, Ohio

[21] Appl. No.: 785,975

[22] Filed: Oct. 31, 1991

[51] Int. Cl.[5] .................. F16D 35/00; F16D 43/25
[52] U.S. Cl. .......................... 192/58 B; 192/82 T; 192/110 B
[58] Field of Search ................. 192/58 B, 82 T, 35, 192/110 B

[56] References Cited

U.S. PATENT DOCUMENTS

| | | | |
|---|---|---|---|
| 3,880,265 | 4/1975 | Elmer | 192/58 B |
| 4,265,348 | 5/1981 | Clarke | 192/58 B |
| 4,270,641 | 6/1981 | Nonnenmann et al. | 192/82 T |
| 4,271,945 | 6/1981 | Budinski | 192/58 B |
| 4,310,084 | 1/1982 | Nonnenmann | 192/58 B |
| 4,346,797 | 8/1982 | Bopp | 192/58 B |
| 4,650,045 | 5/1987 | Weible et al. | 182/0.02 R |
| 4,828,088 | 5/1989 | Mohan et al. | 192/58 B |
| 4,846,325 | 7/1989 | Mohan | 192/58 B |
| 4,874,072 | 10/1989 | Mohan et al. | 192/58 B |

FOREIGN PATENT DOCUMENTS 0091032  5/1985  Japan ........................ 192/82 T

*Primary Examiner*—Rodney H. Bonck
*Attorney, Agent, or Firm*—L. J. Kasper

[57] ABSTRACT

A fluid coupling device is provided of the type including an input coupling (11) and an output coupling assembly (13) including a case cover member (17) including a chimney portion (39) and chimney extension (81). The coupling includes a valve plate (31) defining a fluid port (45), and operation of the coupling is controlled in response to the rotational position of the valve arm (43), by means of a valve shaft (41). The position of the valve shaft (41) is controlled, in response to an electrical input signal by means of an actuator assembly (61), which includes an annular steel housing member (63). The housing member is stationary, and is mounted relative to the chimney extension (81) by means of a set of ball bearings (77) which comprise the only bearing support between the actuator assembly (61) and the rotating coupling. As a result of this design, there is no high speed interface between the rotating coupling and the stationary actuator assembly to result in excessive wear, heat generation, and degradation of performance.

5 Claims, 2 Drawing Sheets

VISCOUS FLUID COUPLING AND REMOTE CONTROL ASSEMBLY THEREFOR

BACKGROUND OF THE DISCLOSURE

The present invention relates to viscous fluid couplings, and more particularly, to such couplings which are used to drive vehicle radiator cooling fans, wherein the engagement or disengagement of the viscous fluid coupling is controlled in response to a remotely sensed condition, such as coolant temperature.

Viscous fluid couplings have been in commercial use for many years to drive the vehicle radiator cooling fan, especially on vehicles such as automobiles and light trucks. The use of such viscous couplings has been widespread, and quite desirable because such couplings can operate in either an engaged condition, or a disengaged condition, depending upon a sensed temperature condition. Most of the couplings (viscous fan drives) which have been in commercial use include some form of temperature-sensing bimetallic element which senses ambient air temperature adjacent the fan drive, and controls valving within the fan drive in response to the sensed temperature, to achieve either the engaged or the disengaged condition, as is appropriate.

In certain vehicle applications, it has become desirable to sense directly the temperature of the liquid coolant entering the radiator, and to control the viscous fan drive in response to the coolant temperature, whereby the responsiveness of the fan drive is improved, when compared to the conventional fan drive which senses the ambient air temperature.

In order to improve the ability to control such remote-sensing fan drives, it has been considered desirable to convert the sensed temperature into an electrical signal, and to control the engagement of the fan drive by means of that electrical signal. Such electrical control also makes it possible to incorporate more sophisticated logic in the control system. U.S. Pat. No. 4,846,325, assigned to the assignee of the present invention, and incorporated herein by reference, discloses a remote-sensing viscous fan drive in which there is electromagnetic control of the frictional engagement of an armature, relative to a stationary housing, thereby controlling the rotary position of a valve element in the fan drive to cover or uncover a fluid inlet port. In the device of the referenced patent, the electromagnetic control includes a tethered housing through which extends an armature shaft, connected to the valve element of the fan drive. The armature shaft is supported, relative to the stationary housing by means of a pair of bearing sets. There is an additional bearing set disposed between the stationary housing and the cover assembly of the rotating fan drive.

During the development of a commercial product, in accordance with the referenced patent, it was observed that the relatively large speed difference (e.g., 3000 rpm) between the stationary housing and the rotating fan drive could result in excessive wear between the armature shaft and the control housing. In addition, the need for at least three bearing sets substantially increased the complexity and cost of the design, thus making such fan drives economically unacceptable for many vehicle applications.

SUMMARY OF THE INVENTION

Accordingly, it is an object of the present invention to provide an improved remote-sensing viscous fluid coupling, and a control assembly of the type described above for such a coupling, which control assembly eliminates the high speed difference between the armature shaft and the control housing, and substantially eliminates the resulting wear of the shaft and/or the housing.

It is a further object of the present invention to provide such a remote-sensing control assembly which makes it possible to use only a single bearing set, and further makes it possible to use a commercially available bearing set, thus substantially decreasing the cost of the assembly.

The above and other objects of the invention are accomplished by the provision of a fluid coupling device of the type including a first rotatable coupling member defining an axis of rotation, enclosure means associated with the first coupling member to define a fluid chamber therebetween, and valve means associated with the first coupling member and disposed to separate the fluid chamber into a fluid operating chamber and a fluid reservoir chamber. A second rotatable coupling member is disposed in the fluid operating chamber and is rotatable relative to the first coupling member. One of the first coupling member and the enclosure means cooperates with the second coupling member to define a viscous shear space therebetween, the valve means being operable to control the flow of fluid between the reservoir chamber and the operating chamber, and having actuating means associated with the valve means to effect the operation thereof, in response to changes in a predetermined condition. The valve means includes a plate-like member defining a fluid port, and a movable valve member operably associated with the actuating means and with the fluid port to control the flow of fluid therethrough in response to the changes in the predetermined condition. The valve member comprises a generally flat member disposed to move in a plane generally perpendicular to the axis of rotation and in a plane generally parallel to the plate-like member, and closely spaced thereto. The enclosure means includes a cast cover member defining a generally cylindrical portion having its axis approximately coincident with the axis of rotation. The actuating means comprises a stationary housing member, an electromagnetic coil disposed within the housing member and adapted to receive an electrical actuation signal representative of the predetermined condition, and an armature assembly including a shaft member extending axially through the cylindrical portion and closely space apart therein, and operably associated with the valve member. The armature assembly further includes an armature member fixed to rotate with the shaft member and means operable to retard rotation of the armature member relative to the housing member in response to actuation of the electromagnetic coil.

The improved fluid coupling device is characterized by bearing means disposed radially between the generally cylindrical portion and the stationary housing member, the bearing means being of the type including inner and outer race members, and a plurality of varying members disposed radially between the race members. Seal means is disposed between the generally cylindrical portion and the shaft member, the shaft member rotating relative to the generally cylindrical portion only when the electromagnetic coil is actuated and retarding rotation of the armature assembly, relative to the stationary housing member.

DESCRIPTION OF THE PREFERRED EMBODIMENTS

Figure 1:
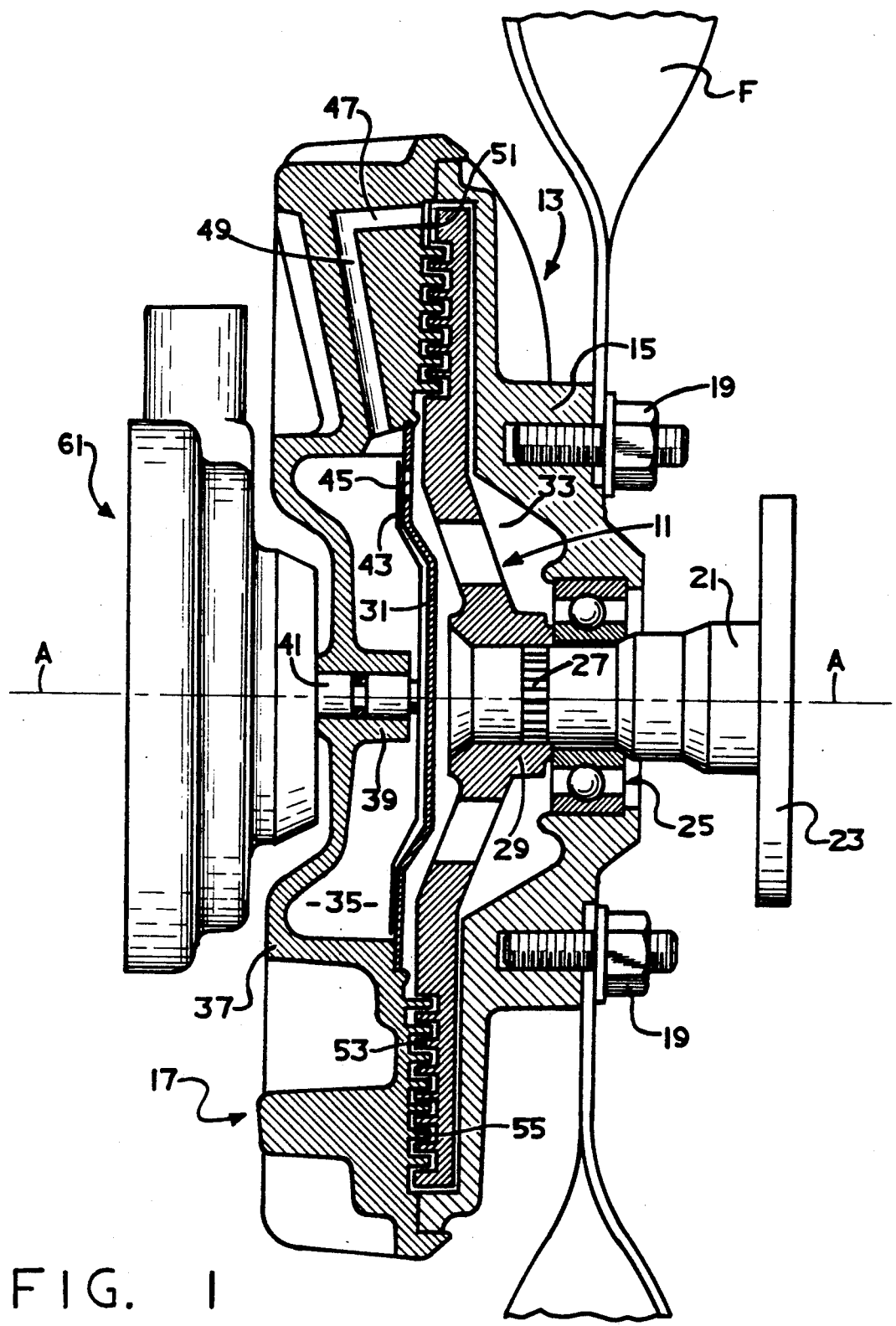
FIG. 1 is an axial cross-section of a viscous fluid coupling including the remote-sensing control assembly of the present invention, shown totally in external plan view.

Referring now to the drawings, which are not intended to limit the invention, FIG. 1 illustrates one preferred form of a viscous fluid coupling (viscous fan drive) of the type with which the present invention may be utilized. The fluid coupling illustrated in FIG. 1 includes an input coupling member, generally designated 11, and an output coupling assembly, generally designated 13. The output coupling assembly 13 includes a die-cast housing member 15 and a die-cast cover member 17, the members 15 and 17 being secured together by a rollover of the outer periphery of the cover member 17, as is well known in the art. The fluid coupling is adapted to be driven by a liquid cooled engine and, in turn, drives a radiator cooling fan F. The fan F may be attached to the housing member 15 by means of a plurality of threaded nuts 19. It will be understood however, that the use of the present invention is not limited to any particular configuration of fluid coupling, or any particular application thereof, except as specifically noted hereinafter.

The fluid coupling includes an input shaft 21 on which the input coupling member 11 is mounted. The input shaft 21 is rotatably driven, typically by means of a flange 23, which may be bolted to a mating flange of an engine water pump. The input shaft 21 functions as a support for the inner race of a bearing set 25, which is seated on the inside diameter of the housing member 15. The forward end (left end in FIG. 1) of the input shaft 21 has an interference fit between a serrated portion 27 and an opening defined by a hub portion 29 of the input coupling member 11. As a result, rotation of the input shaft causes rotation of the input coupling member 11.

The housing member 15 and the cover member 17 cooperate to define a fluid chamber which is separated, by means of a circular valve plate 31, into a fluid operating chamber 33, and a fluid reservoir chamber 35. Thus, it may be seen that the input coupling member 11 is disposed within the fluid operating chamber 33. The cover member 17 defines a raised, annular reservoir, defining portion 37, which is disposed to be generally concentric about an axis of rotation A of the device, and further defines a generally cylindrical shaft support portion 39. Rotatably disposed within the shaft support portion 39 is a valve shaft 41, extending outwardly (to the left in FIG. 1) through the cover member 17. In connection with subsequent description of the present invention, the valve shaft 41 will also be referred to as an "armature shaft", for reasons which will become apparent. Attached to the inner end (right end in FIG. 1) of the valve shaft 41 is a valve arm 43, which may be better understood by reference to U.S. Pat. No. 3,055,473, assigned to the assignee of the present invention, and incorporated herein by reference. More specifically, the valve arm 43 may preferably be constructed in accordance with the teachings of U.S. Pat. No. 4,974,712, also assigned to the assignee of the present invention and incorporated herein by reference. Movement of the valve arm 43 controls the flow of fluid from the reservoir chamber 35 to the operating chamber 33, through a fill opening 45 formed in the valve plate 31.

The cover member 17 defines an axial passage 47 in communication with the fluid operating chamber 33, and a generally radial passage 49, which provides fluid communication from the axial passage 47 to the fluid reservoir chamber 35. Disposed adjacent the axial passage 47 is a pumping element (wiper) 51, operable to engage the relatively rotating fluid in the operating chamber 33, and generate a localized region of relatively higher fluid pressure. Therefor, the wiper 51 is operable continually to pump a small quantity of fluid back into the fluid reservoir chamber 35, through the passages 47 and 49, as is well known to those skilled in the art.

In the subject embodiment of the invention, the input coupling member 11 includes a forward surface which defines a plurality of annular lands 53. The adjacent surface of the housing member 17 forms a plurality of annular lands 55. The lands 53 and 55 are interdigitated to define therebetween a serpentine-shaped viscous shear space, which may also be referred to hereinafter by the reference numerals 53 and 55. It is believed that in view of the above-incorporated U.S. patents, those skilled in the art can fully understand the construction and operation of the part of the fluid coupling illustrated in FIG. 1, and described so far, including the various flow paths for the viscous fluid contained therein. When torque is transmitted from the vehicle engine by means of the input shaft 21, to the input coupling member 11, the result is a shearing of the viscous fluid contained in the shear space 53,55, resulting in the transmission of torque to the output coupling assembly 13 and the cooling fan F.

Referring still to FIG. 1, attached to the cover member 17 is a remote sensing actuator assembly, generally designated 61. The assembly 61 is referred to as being "remote sensing" because it is responsive to an electrical input signal transmitted from a remote location at which changes in a predetermined condition are sensed, with the changes in the predetermined condition being represented by changes in the electrical signal transmitted to the actuator assembly 61. Typically the predetermined condition being sensed is the temperature of the liquid coolant in the vehicle radiator through which air is being drawn by the cooling fan F. The assembly 61 is referred to as an "actuator" assembly because it accomplishes the actuation of the valve arm 43 in response to the changes in the electrical input signal. More specifically, the function of the actuator assembly 61 is to rotate the valve arm 43 away from its normal position covering the fill opening 45 (the disengaged condition of the fluid coupling) toward a position in which the valve arm 43 uncovers the fill opening 45 (the engaged condition), as the temperature of the coolant increases.

Figure 2:
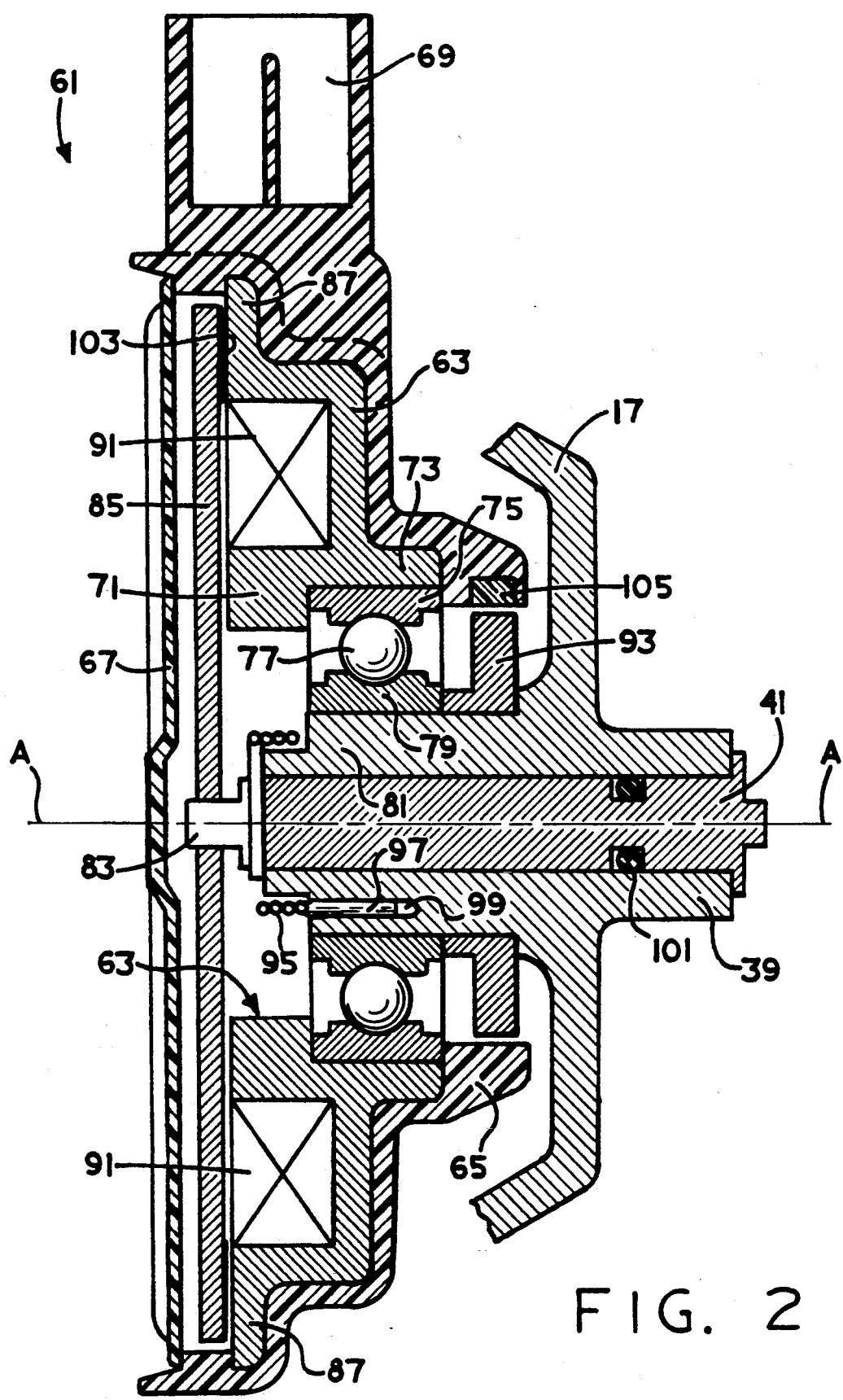
FIG. 2 is an enlarged, axial cross-section of the remote-sensing control of the present invention, including a fragmentary illustration of the cover member.

Referring now to FIG. 2, the remote sensing actuator assembly 61 will be described in some detail. The assembly 61 comprises a main housing assembly, including a generally annular steel housing member 63, which is encapsulated in a molded plastic housing 65. The main housing assembly further includes an actuator cover 67. The plastic housing 65 includes an integrally molded male electrical connector portion 69, which is adapted to be plugged into a suitable female electrical connector (not shown herein) which, as is well known to those skilled in the art, may be part of a tether assembly, attached relative to a stationary object such as the vehicle chassis or fan shroud, neither of which are shown herein. Disposed within the tether assembly would be the appropriate electrical conductors to communicate electrical actuation signals to and from the actuator assembly 61.

Referring still to FIG. 2, the housing member 63 includes a main hub portion 71, which is circumferentially continuous. The housing member 63 also defines a bearing hub portion 73, within which is pressed an outer race 75 of a set of ball bearings 77. The ball bearings 77 are disposed about an inner race 79, which is pressed over the outer periphery of a chimney extension 81. The chimney extension 81 is preferably formed integral with the forward end of the chimney portion 39, and therefor, is rotatable with the cover member 37. Also rotatable with the cover member 37 is the inner race 79 of the ball bearing set 77.

The valve shaft 41 extends, in closely spaced relationship, through the bore defined by the chimney portion 39 and the chimney extension 81. The forward end of the valve shaft 41 includes a flattened portion 83, which extends through a mating opening in an armature member 85. Therefor, during normal operation, the valve shaft 41 and the armature member 85 rotate, as a unit, at the same rotational speed as the cover member 37. By way of contrast, the remainder of the actuator assembly 61 is rotationally stationary. It should be noted that there is a narrow air gap between the main hub portion 71 and the armature member 85.

Disposed radially between the main hub portion 71 of the housing member 63 and an outer portion 87 of the housing member 63 is an electromagnetic coil 91, which is suitably connected to the electrical conductors, which would be disposed within the tether assembly. Disposed radially between the plastic housing 65 and the chimney extension 81 is a multipole magnet 93, the function of which will be described subsequently.

Disposed about the forward end of the valve shaft 41 is a torsion spring 95, which includes an axially-extending end portion 97 disposed within an axial slot 99, defined by the chimney extension 81. The torsion spring 95 constantly biases the valve shaft 41 toward a "neutral" rotational position, relative to the chimney portion 39 and chimney extension 81, the neutral position corresponding to a position of the valve arm 43 covering the fill port 45, i.e., the disengaged condition of the fan drive. Disposed between the valve shaft 41 and the bore defined by the chimney portion 39 is an O-ring seal 101. It is one important aspect of the arrangement shown in FIG. 2 that there is relatively little rotational motion between the valve shaft 41 and the chimney portion 39 and chimney extension 81. Therefor, there is very little cause for wear between the valve shaft and the adjacent bores, and much less wear of the O-ring seal 101 than there would be if the valve shaft-bore interface were subjected to the full speed difference, i.e., the speed difference between the output of the coupling and the stationary actuator 61.

Upon actuation of the coil 91, electromagnetic lines of flux are established around the coil 91, and extending axially through the armature member 85, in a way which pulls the armature member 85 into frictional engagement with an adjacent frictional surface 103 formed on the outer portion 87 of the housing member 63. By way of example only, the frictional surface 103 could be formed of a single layer of a pyrolytic carbon material, although the particular friction material is not an essential element of the embodiment. The result of the frictional engagement is a retarding action of the rotation of the armature member 85, the valve shaft 41, and the valve arm 43, relative to the fill port 45, causing the valve arm 43 to uncover the fill port 45. This general mode of valve actuation is illustrated and described in greater detail in U.S. Pat. Nos. 4,346,797 and 4,846,325, both of which are assigned to the assignee of the present invention, and incorporated herein by reference.

In the above-incorporated U.S. Pat. No. 4,846,325, the location of the frictional engagement between the armature and the adjacent friction surface is shown as being radially inward from the electromagnetic coil, such that the radius (or diameter) of the frictional force is relatively small. It is one important advantage of the design illustrated herein that there is a substantially increased radius of frictional engagement of the armature member 85, and therefor, greater torque at the friction interface, thus decreasing the electromagnetic force which must be applied to the armature 85 to achieve the desired torque on the valve arm 43.

Disposed radially outward from the multipole magnet 93, and also encapsulated within the plastic housing 65, is a Hall device 105, the function of which is to sense the rotational speed of the magnet 93, relative to the stationary Hall device 105. It may be seen that the magnet 93 is pressed onto the chimney extension 81, to be fixed to rotate therewith, and then subsequently, the inner race 79 of the bearing set is pressed onto the extension 81. The Hall device 105 provides a speed pick-up feedback signal to the vehicle microprocessor by means of suitable conductors which are also part of the tether assembly, thus making it possible for the entire cooling system to provide "closed loop" control.

Although the present invention has been disclosed in connection with a friction-type actuator assembly, it should be understood by those skilled in the art that the invention is not limited to any one particular type of actuation, except as specifically recited hereinafter in the appended claims. Within the scope of the present invention, various other types of actuation of the rotatable valve member 43 could be utilized. The essential feature of the present invention is the single bearing arrangement disposed between the stationary actuator housing 63 and the adjacent rotating chimney extension 81. As a result of the arrangement of the present invention, there is no high speed interface, except at the ball bearings, between the stationary actuator and the rotating fluid coupling. The only relative rotational motion between the valve shaft 41 (armature shaft) and the chimney extension 81 is the slight amount of relative rotation (typically, about 20°) when the electromagnetic coil is actuated and the armature member is pulled in frictional engagement with the outer portion 87 of the housing 63. During such a period of frictional engagement, there is relatively high speed movement across the frictional surface 103 but, as is well known to those skilled in the art, the typical friction material which would be used in this application is capable of withstanding such high speed slipping.

It may also be seen that the present invention provides a design which is substantially less expensive than the prior art actuators, because of the need for only a single bearing set, and furthermore, the assembly is greatly simplified, and therefore much less expensive than in the case of prior art actuators including three or more different bearing sets.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A fluid coupling device of the type including a first rotatable coupling member defining an axis of rotation, enclosure means associated with said first coupling member to define a fluid chamber therebetween; valve means associated with said first coupling member and disposed to separate said fluid chamber into a fluid operating chamber and a fluid reservoir chamber; a second rotatable coupling member disposed in said fluid operating chamber and being rotatable relative to said first coupling member, one of said first coupling member and said enclosure means cooperating with said second coupling member to define a viscous shear space therebetween, said valve means being operable to control the flow of fluid between said reservoir chamber and said operating chamber, and having actuating means associated with said valve means to effect the operation thereof in response to changes in a predetermined condition, said valve means including a plate-like member defining a fluid port, and a movable valve member operably associated with said actuating means and with said fluid port to control the flow of fluid therethrough in response to said changes in said predetermined condition, said valve member comprising a generally flat member disposed to move in a plane generally perpendicular to said axis of rotation and in a plane generally parallel to said plate-like member, and closely spaced thereto; said enclosure means including a cast cover member defining a generally cylindrical portion having its axis approximately coincident with said axis of rotation; said actuating means comprising a stationary housing member, an electromagnetic coil disposed within said housing member and adapted to receive an electrical actuation signal representative of said predetermined condition, an armature assembly including a shaft member extending axially through said cylindrical portion, and closely spaced apart therein, and operably associated with said valve member, said cylindrical portion being disposed radially between said shaft member and said stationary housing member, said armature assembly further including an armature member fixed to rotate with said shaft member, and friction means operable to retard rotation of said armature member relative to said housing member in response to actuation of said electromagnetic coil, characterized by:

(a) bearing means being disposed radially between said generally cylindrical portion and said stationary housing member, said bearing means being of the type including inner and outer race members, and a plurality of bearing members disposed radially between said race members; and, (b) seal means disposed between said generally cylindrical portion and said shaft member, said shaft member rotating relative to said generally cylindrical portion only when said electromagnetic coil is actuated and retarding rotation of said armature assembly relative to said stationary housing member.

2. A fluid coupling device as claimed in claim 1 characterized by said friction means comprising frictional engagement between said armature member and an adjacent surface of said stationary housing member, at a location disposed, at least partially radially outwardly of said bearing means.

3. A fluid coupling device of as claimed in claim 1 characterized by said bearing means comprising a single set of bearing members, said single set of bearing members comprising the sole bearing support of said stationary housing member relative to said cast cover member.

4. A fluid coupling device of the type including a first rotatable coupling member defining an axis of rotation, enclosure means associated with said first coupling member to define a fluid chamber herebetween; valve means associated with said first coupling member and disposed to separate said fluid chamber into a fluid operating chamber and a fluid reservoir chamber; a second rotatable coupling member disposed in said fluid operating chamber and being rotatable relative to said first coupling member, one of said first coupling member and said enclosure means cooperating with said second coupling member to define a viscous shear space therebetween, said valve means being operable to control the flow of fluid between said reservoir chamber and said operating chamber, and having actuating means associated with said valve means to effect the operation thereof in response to changes in a predetermined condition, said valve means including a plate-like member defining a fluid port, and a movable valve member operably associated with said means and with said fluid port to control the flow of fluid therethrough in response to said changes in said predetermined condition, said valve member comprising a generally flat member disposed to move in a plane generally perpendicular to said axis of rotation and in a plane generally parallel to said plate-like member, and closely spaced thereto; said enclosure means including a case cover member defining a generally cylindrical portion having its axis approximately coincident with said axis of rotation; said actuating means comprising a stationary housing member, an electromagnetic coil disposed within said housing member and adapted to receive an electrical actuation signal representative of said predetermined condition, an armature assembly including a shaft member extending axially through said cylindrical portion, and closely spaced apart therein, and operably associated with said valve member, said cylindrical portion being disposed radially between said shaft member and said stationary housing member, said armature assembly further including an armature member fixed to rotate with said shaft member, characterized by:

(a) bearing means being disposed radially between said generally cylindrical portion and said stationary housing member, said bearing means being of the type including inner and outer race members, and a plurality of bearing members disposed radially between said race members; and, (b) said plurality of bearing members comprising substantially the only bearing support of said stationary housing member relative to said cast cover member.

5. A fluid coupling device of the type including a first rotatable coupling member defining an axis of rotation, enclosure means associated with said first coupling member to define a fluid chamber therebetween; valve means associated with said first coupling member and disposed to separate said fluid chamber into a fluid operating chamber and a fluid reservoir chamber; a second rotatable coupling member disposed in said fluid operating chamber and being rotatable relative to said first coupling member, one of said first coupling member and said enclosure means cooperating with said second coupling member to define a viscous shear space therebetween, said valve means being operable to control the flow of fluid between said reservoir chamber and said operating chamber, and having actuating means associated with said valve means to effect the operation thereof in response to changes in a predetermined condition, said valve means including a plate-like member defining a fluid port, and a movable valve member operably associated with said means and with said fluid port to control the flow of fluid therethrough in response to said changes in said predetermined condition, said valve member comprising a generally flat member disposed to move in a plane generally perpendicular to said axis of rotation and in a plane generally parallel to said plate-like member, and closely spaced thereto; said enclosure means including a cast cover member and a generally cylindrical portion having its axis approximately coincident with said axis of rotation; said actuating means comprising a stationary housing member, an electromagnetic coil disposed within said housing member and adapted to receive an electrical actuation signal representative of said predetermined condition, an armature assembly operably associated with said valve member, said cylindrical portion being disposed radially inwardly from said stationary housing member, characterized by:

(a) bearing means being disposed radially between said generally cylindrical portion and said stationary housing member, said bearing means being of the type including inner and outer race members, and a plurality of bearing members disposed radially between said race members; and, (b) said plurality of bearing members comprising substantially the only bearing support of said stationary housing member relative to said enclosure means.

* * * * *